(12) United States Patent
Suprasadachandranpilliai (10) Patent No.: US 9,305,103 B2
(45) Date of Patent: Apr. 5, 2016

(54) METHOD OR SYSTEM FOR SEMANTIC CATEGORIZATION (75) Inventor: Syama Prasad Suprasadachandranpilliai, Karnataka (IN)

(73) Assignee: Yahoo! Inc., Sunnyvale, CA (US)

(*) Notice: Subject to any disclaimer, the term of this patent is extended or adjusted under 35 U.S.C. 154(b) by 74 days.

(21) Appl. No.: 13/541,566

(22) Filed: Jul. 3, 2012

(65) Prior Publication Data

US 2014/0012854 A1    Jan. 9, 2014

(51) Int. Cl.
*G06F 17/30* (2006.01)

(52) U.S. Cl.
CPC ................ *G06F 17/30873* (2013.01)

(58) Field of Classification Search
CPC .......... G06F 17/30867; G06F 17/30; G06F 17/3053; G06F 17/3064; G06F 17/30864; G06F 17/2785; G06F 17/2795; G06F 17/30663; G06F 17/30707
USPC ......... 707/737, 740, 754, 759, 722, 728, 730, 707/767, 768
See application file for complete search history.

(56) References Cited

U.S. PATENT DOCUMENTS

| | | | |
|---|---|---|---|
| 7,350,187 B1 | 3/2008 | Tong et al. | |
| 8,204,883 B1* | 6/2012 | Smith | G06Q 30/02 707/736 |
| 2005/0080613 A1* | 4/2005 | Colledge et al. | 704/9 |
| 2009/0210391 A1* | 8/2009 | Hall et al. | 707/3 |
| 2010/0205198 A1* | 8/2010 | Mishne et al. | 707/759 |
| 2010/0299343 A1* | 11/2010 | Ahari et al. | 707/759 |
| 2011/0225019 A1* | 9/2011 | Taylor et al. | 705/7.28 |
| 2011/0314018 A1* | 12/2011 | Bieniosek et al. | 707/737 |
| 2012/0011112 A1* | 1/2012 | Bian | G06F 17/30864 707/723 |
| 2012/0109966 A1* | 5/2012 | Liang et al. | 707/740 |
| 2012/0209835 A1* | 8/2012 | Ahari et al. | 707/723 |
| 2012/0254188 A1* | 10/2012 | Koperski et al. | 707/740 |
| 2012/0284253 A9* | 11/2012 | Ghosh et al. | 707/711 |
| 2012/0296917 A1* | 11/2012 | Osentoski | 707/748 |
| 2012/0303651 A1* | 11/2012 | Tao | 707/768 |
| 2012/0330921 A1* | 12/2012 | Ferrucci et al. | 707/706 |
| 2013/0110830 A1* | 5/2013 | Vadlamani | 707/730 |
| 2013/0173639 A1* | 7/2013 | Chandra et al. | 707/754 |
| 2013/0179420 A1* | 7/2013 | Park et al. | 707/706 |
| 2013/0191400 A1* | 7/2013 | Tao | 707/749 |
| 2013/0212120 A1* | 8/2013 | Ke et al. | 707/767 |
| 2013/0246046 A1* | 9/2013 | Fan et al. | 704/9 |

OTHER PUBLICATIONS

Gianluca Demartini et al.; "Why finding entities in Wikipedia is difficult, sometimes"; May 18, 2010; Springer Science+Business Media.*
Suchanek, et al, "YAGO: A Core of Semantic Knowledge Unifying WordNet and Wikipedia," WWW, May 8-12, 2007, Banff, Alberta, Canada, pp. 697-706.

* cited by examiner

*Primary Examiner* — Dennis Truong
(74) *Attorney, Agent, or Firm* — Berkeley Law & Technology Group, LLP (57) ABSTRACT

Methods and/or systems are provided that may be utilized to rank categories of an entity based at least in part on relevance.

20 Claims, 9 Drawing Sheets

Categories: IUCN Category II | Yosemite National Park | Sierra Nevada (U.S.) | Protected areas established in 1890 | Parks in Madera County, California | Parks in Mariposa County, California | Parks in Tuolumne County, California | Wilderness Areas of California | World Heritage Sites in the United States | Hetch Hetchy Project | Protected areas of the Sierra Nevada (U.S.) | National parks in California

Ocean's Twelve

1. George Clooney as Daniel Ocean
2. Brad Pitt as Rusty Ryan
3. Matt Damon as Linus Caldwell
4. Bernie Mac as Frank Catton
5. Elliott Gould as Reuben Tishkoff
6. Casey Affleck as Virgil Malloy
7. Scott Caan as Turk Malloy
8. Eddie Jemison as Livingston Dell
9. Don Cheadle as Basher Tarr
10. Shaobo Qin as "The Amazing" Yen

METHOD OR SYSTEM FOR SEMANTIC CATEGORIZATION

BACKGROUND

1. Field

The subject matter disclosed herein relates to a method or system for semantic categorization of one or more entities based at least in part on relevance.

2. Information

There are currently numerous content sources in existence, including open content sources such as Wikipedia or Del.icio.us.com. Some content sources have categorization of entities. For example, an article for an entity, such as a professional baseball player on Wikipedia may include various categories such as a name of the baseball player's team, a position played by the player, a state where the baseball player was born, a college at which the baseball player attended, to name just a few examples of possible categories. Categories for an entity may be manually created by users of a content source.

Categories for an entity in a content source may contain a wealth of electronic content descriptive of the entity. However, although a particular article or entry on a content source may be associated with several categories, a collection of numerous manually created categories for a particular entity may not provide sufficient information for an individual to determine most relevant or popular categories associated with the entity.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Reference throughout this specification to "one example", "one feature", "an example", or "a feature" means that a particular feature, structure, or characteristic described in connection with the feature or example is included in at least one feature or example of claimed subject matter. Thus, appearances of the phrase "in one example", "an example", "in one feature" or "a feature" in various places throughout this specification are not necessarily all referring to the same feature or example. Furthermore, particular features, structures, or characteristics may be combined in one or more examples or features.

Embodiments of systems and/or methods are provided herein for that may be utilized to rank categories of an entity or item based at least in part on relevance of the categories. An "entity" or "item," as used herein, may refer to one or more terms, such as descriptive words or characters, for example. In one embodiment, an entity may refer to one or more things such as a person, place, thing, idea, concept, action, term, or any other searchable item, for example.

An entity may be associated with one or more lists or one or more categories. A "list," as used herein, refers an electronically associated grouping of entities have one or more common aspects. For example, if an actor, such as Brad Pitt, comprises an entity, Brad Pitt may be associated with similar entities in a list such as "Actors in Ocean's Eleven" or "Actors born in 1963," to name just two possible examples of lists. A list may be presented, such as to a user, within a column or row of a table, for example, although claimed subject matter is not limited to this example. In one implementation, a spreadsheet may include a column for the movie "Ocean's Eleven" in which different actors or actresses from a movie are provided in the column, as an example. Accordingly, entities or items within a column may collectively form a list of the entities, for example.

A "category," as used herein may refer to a classification or tag manually provided to identity an entity. Referring to the example listed above, an entity such as Brad Pitt may also fall within a category such as "American Actors" or "Movie Actors," for example. For example, the Brad Pitt page in Wikipedia has a large number of user defined categories towards the bottom of the page. Many open sources contain various classification levels of its entities, for example. A list, by comparison, may comprise any labelled or unlabelled (e.g., without a title) collection of entities in a source, such as a repository or similar corpus, such as in form of HTML lists or tables, for example Since a list may not have a title, it might not be feasible to be used for classification or ranking, for example There are several content sources available on the Internet. Examples of content sources include, for example, relatively high trafficked and/or popular domains such as Wikipedia or Del.icio.us.com. A "source" or "content source," as used herein, refers to an accessible database, storage repository or similar source containing content as one or more associations between one or more entities, one or more categories, or one or more lists, e.g., in the form signals or states representing stored or storable content information. A content source may be electronically editable, such as by one or more individuals, for example. A content source may contain numerous entities, lists of entities and/or categorization of entities.

An entity within a content source, such as Wikipedia, for example, may include one or more descriptions or explanations relating to the entity. For example, if an entity comprises an actor, such as Brad Pitt, as discussed above, the entity may include stored background content about Brad Pitt, such as stored content pertaining to Brad Pitt's early life, movie roles, political views, and home life, to name just a few examples, such as may be included in a description or article relating to an entity. For example, an entity may also be associated with one or more categories or one or more lists, for example. In the example of Brad Pitt, the actor may be associated with one or more lists, such as lists available electronically pertaining to one or more movie roles in which he or other actors have performed. For example, an article on Wikipedia relating to Brad Pitt may be electronically associated (e.g., by a hyperlink as one example) with lists such as "Actors in Troy" or "Actors in Ocean's Eleven," for example.

Some content sources provide categorization of entities. For example, an article for an entity, such as a professional baseball player on Wikipedia, may indicate various categories, such as a name of the baseball player's team, a position played by the player, a state where the baseball player was born, a college at which the baseball player attended, to name just a few examples of possible categories. Categories for an entity may be manually created, such as by users of a content source, for example.

A distinction between a category and a list, for example, may be based at least in part on a format by which content may be presented or available electronically. For example, a content source, such as Wikipedia, may specifically identify categories associated with an entity in a certain location of a web page containing an article pertaining to the entity. For example, an article relating to Brad Pitt may include a listing of categories associated with the actor near the bottom of the article with those categories specifically identified. An article about Brad Pitt may also be electronically associated with one or more lists, as discussed above. A list, however, may not be specifically identified as being a list in one embodiment. Instead, if a listing or grouping is not specifically identified as a category, in one or more implementations, for example, it may be considered a list. As indicated, a category refers to a collection of manually edited, such as a managed collection of entities. A category, for example, may have a title/name and represent the entity. A list refers to an unordered collection of entities, such as within a content source. A list, for example, may not have a title and semantically may not represent an entity. Lists are more like associations of an entity whereas a category may refer to a definition. In Wikipedia, as one example, specific category pages are provided for qn entity towards the bottom of the page.

According to one embodiment, for example, an entity may be associated with (e.g., included within) one or more categories. Categories associated with an entity may be identified based at least in part on content, such as stored in one or more content sources, such as Wikipedia or Del.icio.us.com, as discussed above. Categories may be ranked based at least in part on relevance. Accordingly, if an entity is associated with 10 categories, the 10 categories may be ranked based at least in part on relevance for the entity. For example, a relevance score may be determined to indicate a relevance of a category to an entity. In one embodiment, for example, one or more of categories with relevance scores may be presented, such as to a user who may have submitted a search query, for example. For example, if a user submits a search query, search results may be determined and/or links to the search results may be presented, such as via a graphical user interface, for example. Moreover, in addition to search results, one or more relevant categories may also be presented, as previously discussed. In one embodiment, a relevance score for a category may be presented, such as alongside a category on a graphical user interface, for example. In one embodiment, for example, relevant categories may be presented based at least in part on a number of the categories having a category relevance score exceeding a threshold value. In another embodiment, for example, a certain number of relevant categories, such as those having higher scores, for example, based at least in part on a specific measure or scoring approach may be determined and/or presented, such as to a user via a graphical user interface, for example.

A process, apparatus, and/or system as described herein, for example, may provide for contextually independent ranking(s) of categories of an entity based at least in part on relevance of the categories to the entity. A search engine may receive a search query, such as from a user submitted, for example, via a search or text box, to a server from a client, for example (e.g., via a browser). In response to receiving a search query, one or more servers, processors, or other devices, associated with a search engine may search an index to determine one or more search results, such as links to content, such as one or more web sites, web documents, audio, video or image files, to name just a few examples, that may be determined to be relevant to the search query. However, phrasing of a search query may vary depending on submitter, for example.

Figure 1:
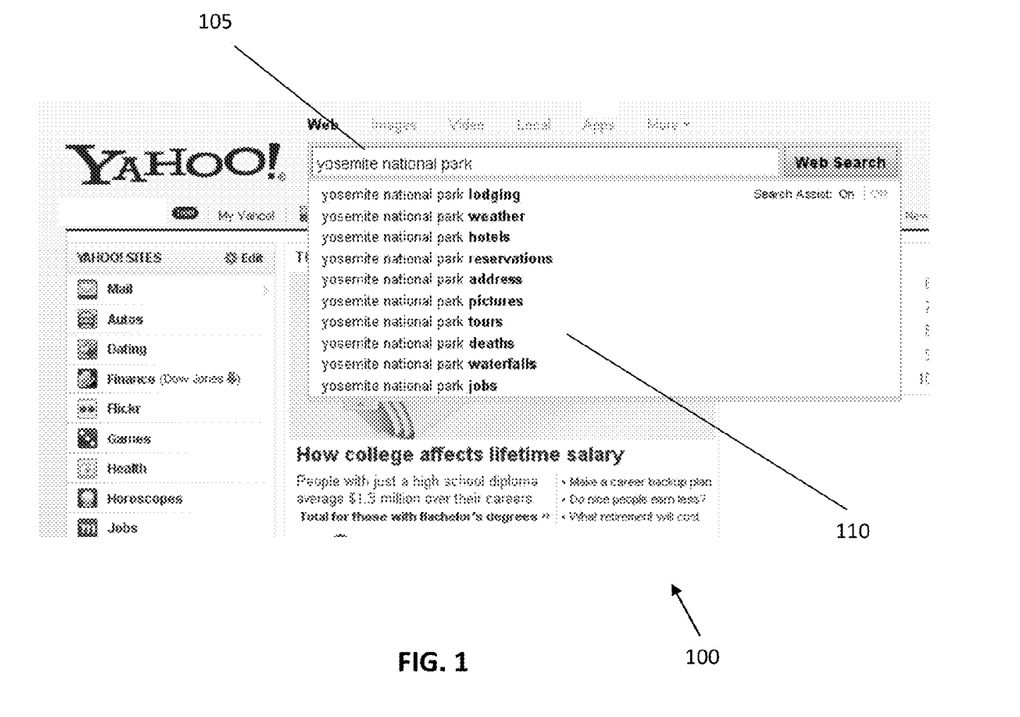
FIG. 1 illustrates an example display screen, such as may be presented to a user submitting a search query to a search engine, according to one embodiment.

In one embodiment, for example, suggestions of related searches may be determined to be relevant to a search query. FIG. 1 illustrates an example display screen, such as 100, that may be presented to a user submitting a search query to, for example, the Yahoo!™ search engine, according to one embodiment. As shown, a search query, "yosemite national park" may be submitted via a search query box 105 (e.g., client-server) In one embodiment, for example, related search queries 110 may be presented as a particular search query is typed into search query box 105, and prior to submitting the search query to the search engine, for example. In this example, related searches such as "yosemite national park lodging," and "yosemite national park weather" may be presented as alternative searches, for example.

Figure 2:
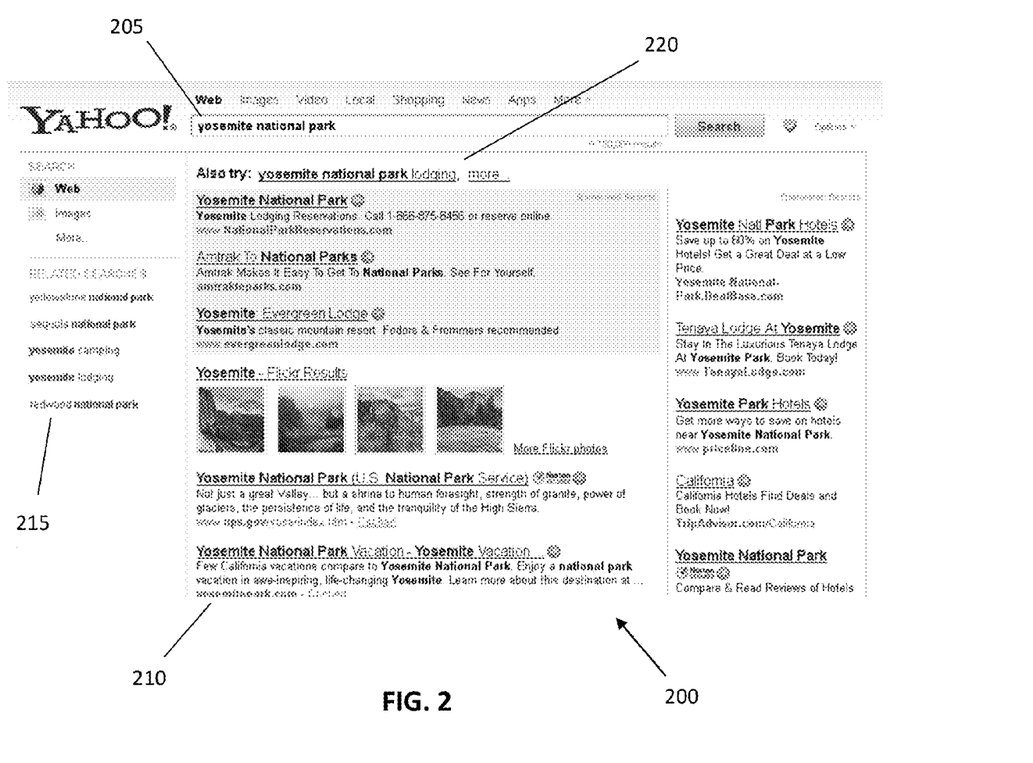
FIG. 2 illustrates another example display screen, such as may be presented to a user who has submitted a search query to a search engine, according to one embodiment.

FIG. 2 illustrates another example, display screen, such as 200, according to one embodiment. As shown, after a search query, "yosemite national park" is entered into a search query box 205, results 210 may be determined by a search engine, such as links to images of Yosemite National Park, links to a government website for Yosemite National Park, and/or to a vacation website for Yosemite National Park, etc., as shown. One or more related search queries may also be presented. For example, search queries 215 and/or search queries 220 may be presented via display, for example.

Although related search queries may be useful in refining a search query, additional assistance may help a user to more quickly refine a search query in some instances. For example, as discussed above, categories determined to be relevant to an entity, such as one or more words or terms, in a search query may be associated with one of more categories. Relevant categories may be presented, for example, to assist in refining a search query.

Content relating to categories for a particular entity, such as relating to Yosemite National Park, for example, may be obtained, such as, from one or more content sources. As discussed above, content relating to categories may be obtained from Wikipedia, Del.icio.us.com, and/or other similar web sites or domains. Various categories may be obtained and ranked for relevance, for example.

Figure 3:
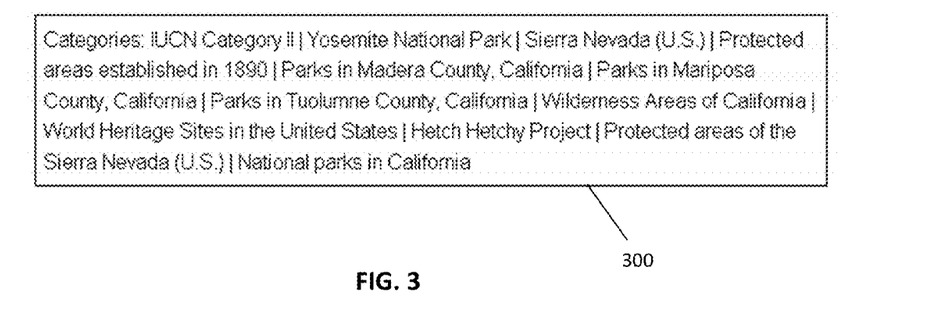
FIG. 3 illustrates categories that may be obtained from a content source according to one embodiment.

FIG. 3 illustrates categories 300 that may be obtained from a content source according to one embodiment. For example, categories 300 may be obtained from an article for an entity, such as "Yosemite" from Wikipedia, Del.icio.us.com, or some other content source. In this example, categories 300 include "IUCN Category II," "Yosemite National Park," and "Sierra Nevada (U.S.)," to name just a few example categories 300. Categories relating to an entity, such as Yosemite National Park, in this example, may be ranked, as discussed further below.

Figure 4:
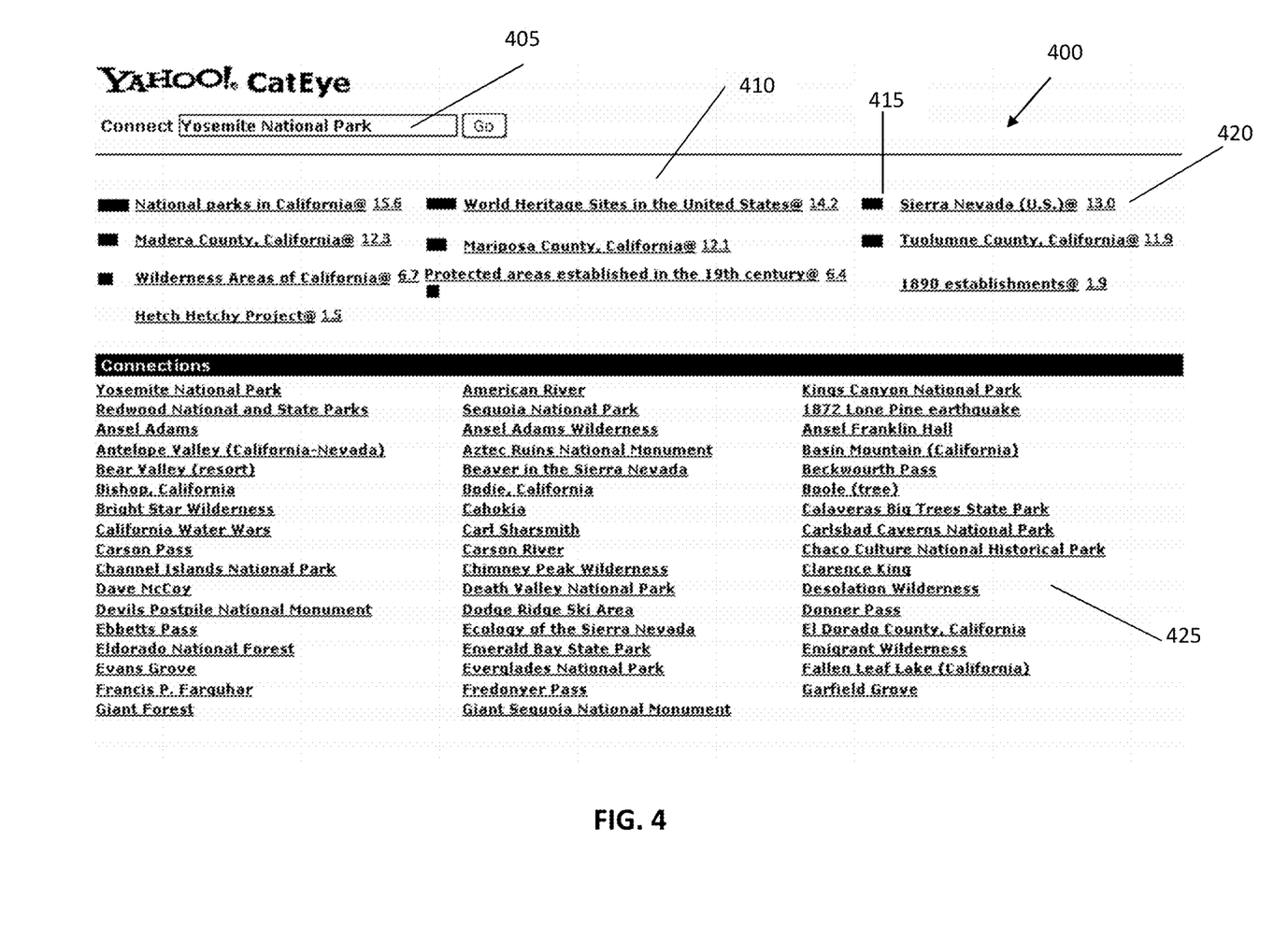
FIG. 4 illustrates an yet another example display screen, such as may be presented to a user who has submitted a search query to a search engine, according to one embodiment.

FIG. 4 illustrates yet another example display screen, such as 400, that may, for example, be presented to a user who has submitted a search query, such as to a search engine, such as the Yahoo!™ CatEye™ search engine, according to one embodiment. Yahoo!™ CatEye™ may comprise a search engine capable of determining one or more categories relevant to a search query submitted via a client search query box 405, which in this example shows "Yosemite National Park" as a submitted search query. One or more categories 410 related to a "Yosemite National Park" may be determined, for example. In this example, related categories 410 may include "National parks in California," "World Heritage Sites in the United States," "Sierra Nevada (U.S.)," as well as several other relevant categories. One or more related categories may be presented with a relatedness measure, such as, for example, indicator 415 or a relatedness score 420, in one embodiment. As shown, a relatedness indicator 415 for a category, "Sierra Nevada (U.S.)," may indicate relevance on a relative basis, for example. Also, as shown, category "Sierra Nevada (U.S.)" may be associated with a relevance score of 13.0. Relevance scores may be normalized or scaled for comparison purposes in one embodiment. Of course, a variety of approaches are possible and intended to be included within claimed subject matter.

For example, various categories 425 related to "Yosemite National Park" may be determined. Semantically similar or related categories may be presented under a heading, "Connections" shown in FIG. 4. "Semantic similarity," or "semantic relatedness," as used herein may refer to likeness between two or more documents, terms, or objects based at least in part on one or more similarity metrics. For example, one or more documents or terms may be assigned a metric based at least in part on likeness or similarity of meaning, such as likeness or similarity of semantic content, in one example. Related categories 425 shown in FIG. 4 may comprise categories that are not directly associated with "Yosemite National Park" in a source, for example, but that are otherwise determined to be related to the "Yosemite National Park" employing a metric, for example.

For example, related categories may be determined via a Natural Language Processing (NLP)-type process in one embodiment. An "NLP-type category," as used herein, may refer to a related category identified or determined based at least in part on an NLP-type process. For example, semantics relating to a particular entity, such as "Yosemite National Park," may be utilized by an NLP-type process to identify one or more related categories. For example, machine learning, such as, for example, statistical machine learning, may be utilized to identify related categories in one embodiment. As shown in FIG. 4, related categories 425 may be presented under a "connections" tab, heading on a display screen, such as 400, or otherwise, for example.

An evaluation may be conducted of an NLP type process. It may be employed, for example, to characterize performance with respect to a generally accepted, so to speak, gold standard result, which may comprise a set of computational evaluators. Extrinsic evaluation, also referred to as "evaluation in use" may evaluate an NLP type process in a more complex setting, such as in an embedded system or serving a precise function, such as for a user, for example. Extrinsic performance of an NLP type process may be characterized in terms of utility with respect to a task of a complex system or by a user, as an illustration. For example, in one embodiment, a syntactic parser may be based at least in part on results of a speech (POS) tagger, again, as an illustration. Likewise, an evaluation may also, as an example, operate a POS tagger on samples, for example, and may compare NLP type process results of the POS tagger, for example, to benchmark results of the generally accepted gold standard. Likewise, an evaluation may run a parser with some other POS tagger, and then with the initial POS tagger, and compare parsing accuracy.

So-called "black-box" evaluation may include an NLP type process evaluation on a given set of stored state information and may measure a number of parameters related to quality of a process, such as, for example, in terms of relative speed, reliability, and/or resource consumption, for example. An evaluation may also measure a quality of a result, such as, for example, in terms of relative accuracy of stored state information annotation or fidelity of a translation. An evaluation may evaluate architecture; for example, of an NLP type process, one or more implemented processes, and linguistic resources utilized, such as, vocabulary size, for example. With the complexity of issues regarding an NLP type process, it may be challenging to predict performance even with such an evaluation, although this type of evaluation may be more informative with respect to error analysis or future developments, for example.

In some cases, procedures may be characterized by comparing results with a benchmark standard, as alluded to previously. Although a cost of producing a universally acceptable standard may be relatively high, evaluation may be repeated without significant marginal cost being incurred. However, establishing a standard may present a complex task, and may perhaps in some situations become infeasible at least given a large diversity of perspectives on relevant or material considerations.

Figure 5:
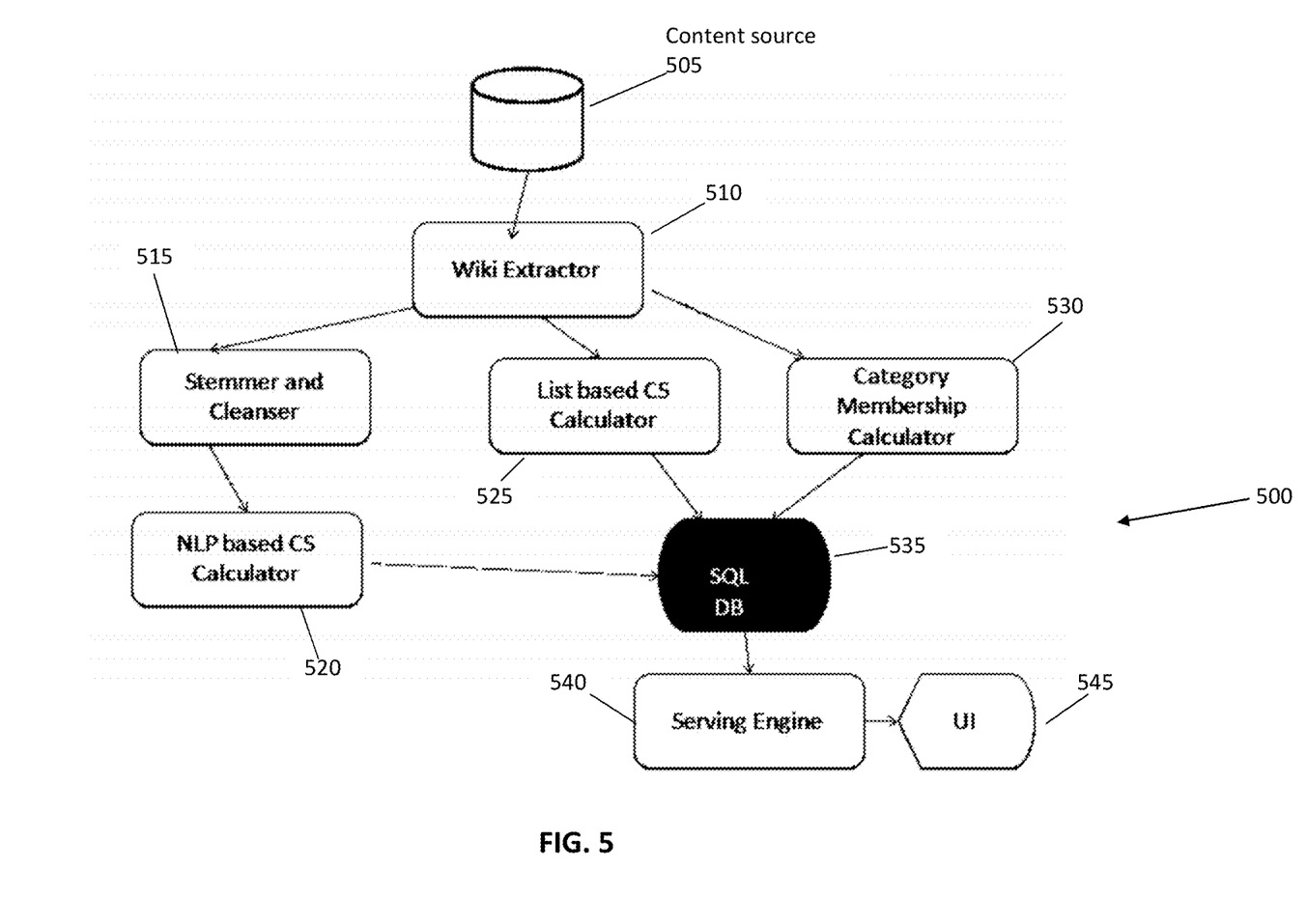
FIG. 5 illustrates a system for presenting categories, such as to a user, according to one implementation.

FIG. 5 illustrates a system 500 for determining categories according to one implementation. System 500 may include a content source 505 from which identities of entities and/or related categories may be obtained. For example, Wikipedia may store web pages in Extensible Markup Language (XML) format that may be retrieved for evaluation to determine one or more relevant or related categories for an entity, such as Yosemite National Park, as discussed above to provide an illustrative example.

In one embodiment, a Wiki extractor 510, for example, may electronically extract one or more titles, descriptions, categories, lists, or entities from one or more pages obtained from a content source. Although a Wiki extractor 510 is shown in FIG. 5, claimed subject matter is not limited to a Wiki type extractor. An extractor may be employed to electronically extract content from a source, such as 505, other than a wiki-type source. Nonetheless, Wiki extractor 510 may communicate one or more messages in the form of electronic signals, for example, to Stemmer and/or Cleanser (e.g., Stemmer/Cleanser) 515 containing information in the form of electronic signals, relating to content obtained from articles in content source 505, such as, for example, title, description, or category information. Stemmer/Cleanser 515 may, in turn, parse received title, description, or category content electronically to remove quotations, semicolons, or other punctuation marks from the received messages and may communicate parsed content, such as to a calculator, such as 520 illustrated in FIG. 5, for example. FIG. 5 illustrates an NLP Based (e.g., type) CS Calculator 520, although, of course, this is merely an example and claimed subject matter is not limited to a particular type of calculator or computation in a particular embodiment. Calculator 520, however, may identify related categories based at least in part on an NLP type process approach.

Figure 6:
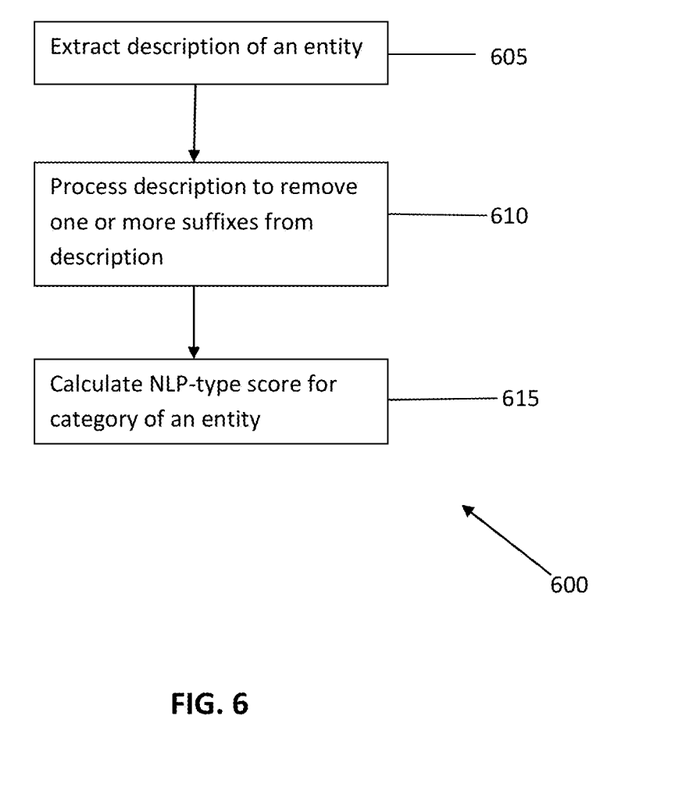
FIG. 6 is a flow diagram of a process for identifying related categories according to one embodiment.

FIG. 6 is a flow diagram of a process 600 for identifying related categories based at least in part on an NLP type process approach according to one embodiment. Embodiments in accordance with claimed subject matter may include all of, less than, or more than blocks 605-615. Also, the order of blocks 605-615 is merely an example order, of course. A description for an entity denoted as Desc(E) may extracted electronically by Wiki extractor 510 from a source, such as 505, for example, at operation 605. Calculator 520 may implement a suffix stripping process, such as via a computing device suitably programmed, for example, at operation 610 to process a description having been received in electronic form. A suffix stripping process may or may not rely on a lookup table type implementation comprising inflected forms and/or root form relations. Alternatively, for example, a smaller list of "rules" may be stored or programmed which may provide an approach in a process embodiment so that, from an input word form, an associated root form may be identified. Examples of suffix stripping process rules may include, for example: (a) if a word or term ends in "ed," remove the "ed"; (b) if a word or term ends in "ing," remove the "ing"; and/or (c) if a word ends in "ly," remove the "ly." Suffix stripping approaches may enjoy a benefit of being relatively simple to maintain in comparison with other more complex linguistic processes, for example.

An NLP type process score may be calculated for a category of an entity at operation 615. A Jaccard index, also known as a Jaccard similarity coefficient, comprises a statistic which may be used to compare similarity and/or diversity of sample sets. A Jaccard coefficient may measure similarity between sample sets, and may be characterized in terms of a size of an intersection divided by a size of a union of a sample sets as shown below in relation [1]:

$$J(A, B) = \frac{|A \cap B|}{|A \cup B|} \quad [1]$$

A scheme, such as, for example, a min-wise independent permutations locality sensitive hashing scheme, may be used to compute an estimate of a Jaccard similarity coefficient of pairs of sets, where a set may be represented by a constant-sized signature derived from selected values of a hash function.

A Jaccard distance, which may measure dissimilarity between sample sets, may be complementary to a Jaccard coefficient and may be obtained by subtracting a Jaccard coefficient from a value of 1, or, equivalently, by dividing a difference of sizes of a union and an intersection of two sets by a size of the union:

$$J_\delta(A, B) = 1 - J(A, B) = \frac{|A \cup B| - |A \cap B|}{|A \cup B|} \quad [2]$$

A category score of CategoryScoreNLPBased(E,C) may be determined based at least in part by dividing (a number of common words in StemmedDesc(E) and C) by (a total number of unique words in StemmedDesc(E) and C). Related categories may be determined based at least in part on a category score of CategoryScoreNLPBased(E,C).

Referring back to FIG. 5, Wiki extractor 510 may communication one or more messages in the form of electronic signals, for example, containing content, such as lists and/or categories, to a calculator, such as a List Based (e.g., type) CS Calculator, such as 525, for example. Calculator 525 may process received lists and/or categories to determine relevance and/or correlation between one or more lists or one or more categories, for example. Wiki extractor 510 may communication messages in the form of electronic signals containing content, such as names or identities of various entities or categories to a calculator, such as a Category Membership Calculator, such as 530, for example. Calculator 530 may process electronically received content, for example, to determine which categories may be associated with which entities.

One or more messages in the form of electronic signals may be communication from calculator 520, calculator 525, or calculator 530 to a database, such as a Structured Query Language Database (SQL DB), for example, such as 535 or some other server or database. Database 535 may store state information indicating one or more category relevance scores for an entity or one or more related categories. Stored state information from database 535 may be communicated messages in the form of electronic signals to a Serving Engine 540. Serving Engine 540 may communicate one or more messages in the form of signals to a client computer or similar device, for example, so that, in one embodiment, relevant categories or related categories are to be displayed on a User Interface (UI) 545 at least partially in response to a user query. For example, a display screen 400 shown in FIG. 4 may be displayed on UI 545 at least partially in response to a user query.

One or more calculations may be performed to calculate a relevance of a particular category to an entity. Relation [3] shown below illustrates an example process which may be utilized to calculate a Category Score (CS) of relevance of a category (C) for an entity (E) contained in one or more lists ($L_i$):

$$CS_{C,E} = \sum_{L_i} [P(C \mid L_i)] * P(L_i \mid E) \quad [3]$$

An entity (E) may comprise an entity such as "Barack Obama," "Brad Pitt," or "Nokia N71," to list just a few examples of possible entities. A category C may comprise a category in which entity (E) is known to reside. For example, as discussed above, one or more categories for an entity may be determined based at least in part on content stored at a source. Examples of categories include "Audio Book Narrators," "Senators," or "Presidents of the United States," to name just a few examples. A list (L) may electronically comprise a collection of similar entities which may be identified within a content source as being a list of related entities or may be listed as table columns, for example, in a spreadsheet indicating related entities, for example.

Figure 7:
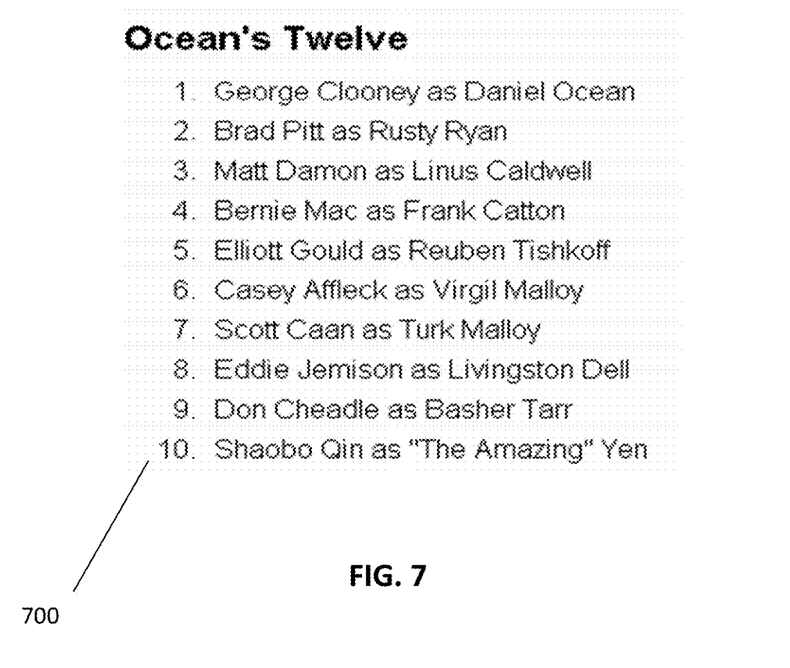
FIG. 7 illustrates a list of entities according to one embodiment.

FIG. 7 illustrates a list 700 of entities according to one embodiment. List 700 may comprises a list of actors, in the form of electronic signals, appearing in the movie, "Ocean's Eleven." In one embodiment, if Brad Pitt comprises an entity, Brad Pitt may be represented electronically on list 700. Brad Pitt may also be represented electronically on one or more other lists. The lists may collectively be utilized to determine a relevance of an entity such as Brad Pitt to a category such as "American Actors," based at least in part on an inclusion of Brad Pitt in one or more lists.

Referring back to relation [3], a CS calculation for a category with respect to an entity may be determined based at least in part on a sum of a product of popularity and a probability determined based at least in part on one or more lists. For example, for an electronic list, $L_i$, a popularity calculation may be determined based at least in part on whether an entity, E, appears in list $L_i$. In the example list 700 shown in FIG. 7, entity Brad Pitt is shown within list 700. In an embodiment, for example, $P(L_i \mid E)$ comprises a measure of popularity of list $L_i$ in connection with entity E. Popularity is one potential measure of importance of list $L_i$ given entity E. For example, one approach of popularity for a set of i lists may comprise $P(L_i \mid E)=1/$(total number of lists E belongs to). However, in another embodiment, a value may be calculated by giving weights to lists based at least in part on context, such as from extraction. For example, a list of items extracted from a popular page might be given higher weight than a list extracted from a new or a not so popular page.

Referring to FIG. 5, in an embodiment, for example, calculation of $P(L_i|E)$ may be performed at least in part by a calculator, such as 525, for example. Referring back to relation [3], calculation of $P(C|L_i)$ may be performed where $L_i$ comprises an electronic list, such as 700, shown in FIG. 7, for example, and a category C comprises an electronic category such as "American Actors," for example. A determination of whether a list is contained within a category may be based at least in part on content obtained from a source. For example, a content source such as Wikipedia may include one or more tags or other notations electronically to indicate that a particular list is associated or falls within a particular category. Referring to FIG. 5, calculation of $P(C|Li)$ may be performed at least in part by a calculator, such as 530, for example, in accordance with the following $$P(C|L_i) = \frac{1}{|L_i|} \sum_{E \in L_i} P(C|E) \quad [4]$$

Here, for example, $P(C|E)$ takes a respective value of 1 or 0 in accordance with whether entity E is present in category C or not. If calculations of $P(L_i|E)$ and $P(C|L_i)$ have been performed for electronic lists, such as $L_i$, for example, relation [3] may be calculated to determine a sum of calculations $P(L_i|E)$ and $P(C|L_i)$ for the various $L_i$. Relation [3] may therefore be utilize to determine a relevance or category score (CS) of category C with respect to entity E. In one embodiment, a higher value of CS for a category C may indicate that category C is more relevant to an entity E than would a lower value of CS, although claimed subject matter is not necessarily limited in this respect.

A score or other calculation based at least in part on relation [3] may be determined for one or more categories of an entity. A score, for example, may be utilized to compare categories of an entity to determine which categories are more relevant using a formal calculation oriented approach and/or to indicate a degree of relevance.

Figure 8:
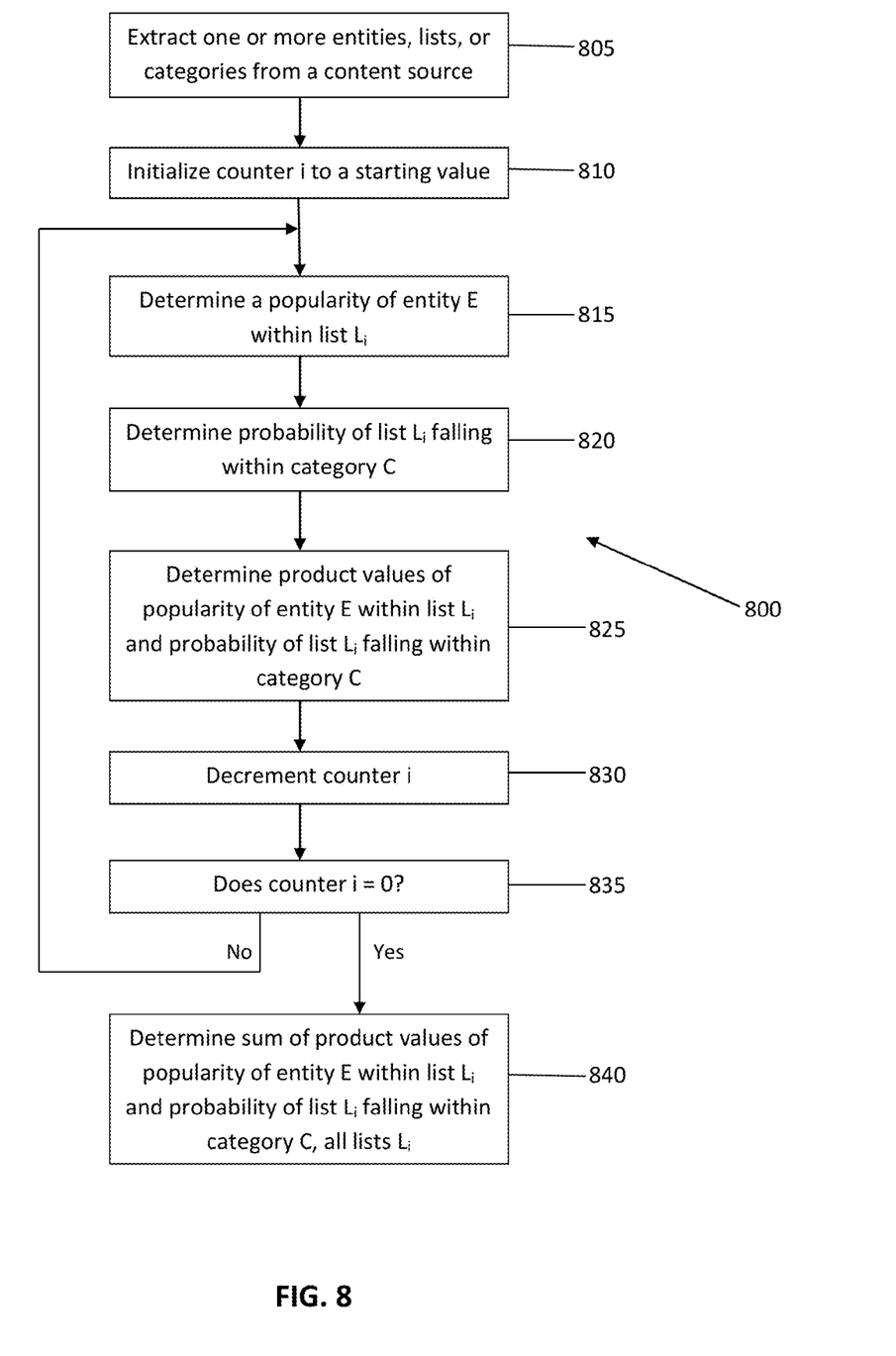
FIG. 8 illustrates a process for determining a category relevance score according to one embodiment.

FIG. 8 illustrates a process 800 for determining a category relevance score according to one embodiment. As discussed above, an entity may fall within several categories. To determine relevance of categories, in an embodiment, a process 800 as shown in FIG. 8 and as recited in relation [3] may be implemented. Embodiments in accordance with claimed subject matter may include all of, less than, or more than blocks 805-840. Also, the order of blocks 805-840 is merely an example order.

One or more entities, lists, or categories may be extracted from a content source at operation 805. At operation 810, a counter i may be initialized to a starting value. For example, if it is known that there are 100 known lists extracted from a content source, counter i may be initialized to a value of "100" in one embodiment. At operation 815, a popularity of entity E within list $L_i$, denoted as $P(L_i|E)$, for example, may be determined. As discussed above, popularity may be determined based at least in part on a variety of possible approaches.

A probability of list $L_i$ falling within category C, denoted as $P(C|L_i)$, for example, may be determined at operation 820. At operation 825, a product of values of popularity of entity E within list $L_i$ and a probability of list $L_i$ falling within category C, denoted as $P(L_i|E)*P(C|L_i)$, for example, may be determined. At operation 830, counter i may be decremented. At operation 835, a determination of whether counter i has a value of "0" may be made. If "no" at operation 835, processing may proceed to operation 815. If "yes," on the other hand, processing may proceed to operation 840 where a sum of product values of popularity of entity E within list $L_i$ and probability of list $L_i$ falling within category C, for the lists $L_i$, as denoted by relation [3] set forth above, for example, may be determined.

Relation [3] as discussed above or with respect to a flowchart shown in FIG. 8 may be relatively language insensitive and/or even language-independent. In other words, processing recited in relation [3] or in a flowchart shown in FIG. 8 may be utilized to determine scores for categories in various different languages other than English. For example, a content source, such as Wikipedia, may be used to convert a name of an entity in one language, such as English, into another language, such as Spanish, if Wikipedia contains articles written for the entity in both English and Spanish. Such language conversion may be utilized to interpolate or convert a list recited in English language into a list recited in Spanish language, for example.

Some entities may be potentially associated with numerous categories, which may produce delays in determining category scores for various entities, for example. In one embodiment, for example, relatively "unimportant" categories may be manually removed or "pruned." An "unimportant category," as used herein may refer to a category having relatively little descriptive value, for example. In one embodiment, an unimportant category may comprise a category in which only one or a relatively small number of entities are associated, for example. The deaths in 1900 or the births in 1991 might be illustrative examples.

Figure 9:
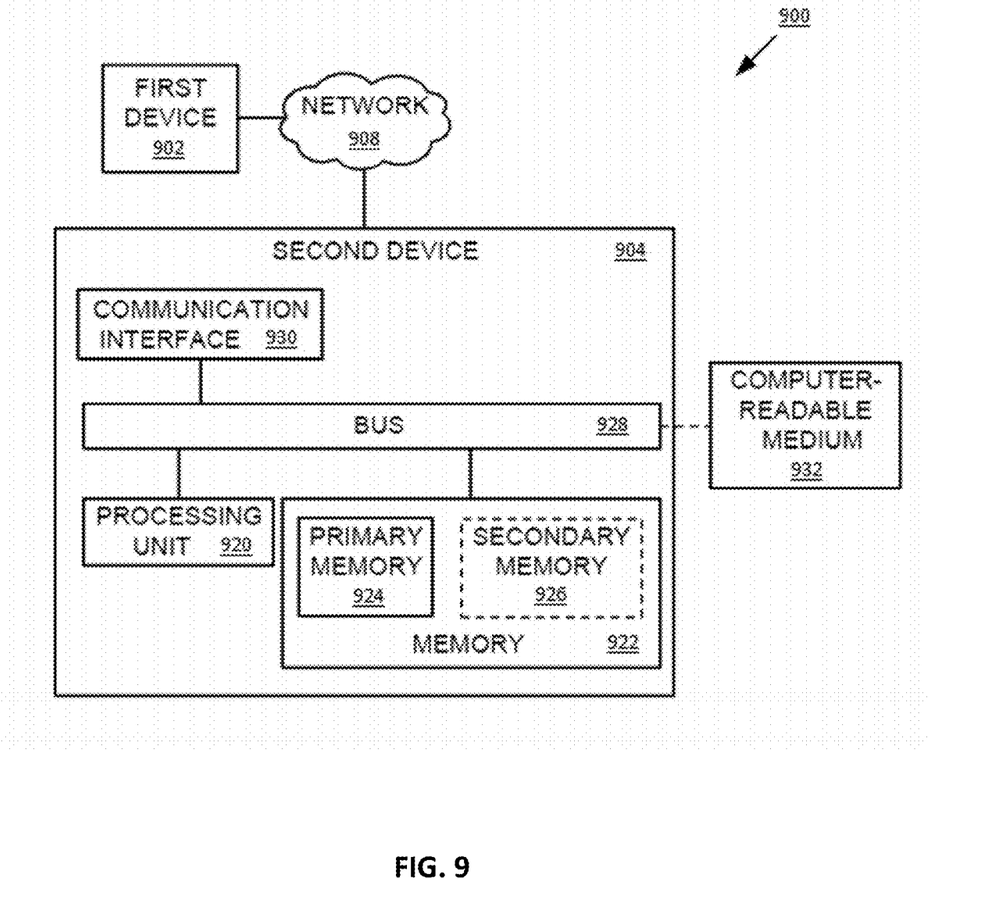
FIG. 9 is a schematic diagram illustrating a computing environment according to one implementation.

By pruning unimportant categories or dissimilar collections, for example, a browseable tree of entities may be generated. For example, a hierarchical classification for an entity such as "camera" may resemble:

/Cameras/Cameras by brand/Canon cameras
/Cameras/Cameras by brand/Canon cameras/Canon ELPH cameras
/Cameras/Cameras by brand/Canon cameras/Canon EOS cameras
/Cameras/Cameras by brand/Canon cameras/Canon EOS cameras/EOS DSLR cameras
/Cameras/Cameras by brand/Canon cameras/Canon EOS cameras/EOS film cameras FIG. 9 is a schematic diagram illustrating a computing environment system 900 that may include one or more devices to display web browser information according to one implementation. System 900 may include, for example, a first device 902 and a second device 904, which may be operatively coupled together through a network 908.

First device 902 and second device 904, as shown in FIG. 9, may be representative of any device, appliance or machine that may be configurable to exchange signals over network 908. First device 902 may be adapted to receive a user input signal from a program developer, for example. First device 902 may comprise a server capable of transmitting one or more quick links to second device 904. By way of example but not limitation, first device 902 or second device 904 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or storage service provider/ system, a network service provider/system, an Internet or intranet service provider/system, a portal or search engine service provider/system, a wireless communication service provider/system; or any combination thereof.

Similarly, network 908, as shown in FIG. 9, is representative of one or more communication links, processes, or resources to support exchange of signals between first device 902 and second device 904. By way of example but not limitation, network 908 may include wireless or wired communication links, telephone or telecommunications systems, buses or channels, optical fibers, terrestrial or satellite resources, local area networks, wide area networks, intranets, the Internet, routers or switches, and the like, or any combination thereof.

It is recognized that all or part of the various devices and networks shown in system 900, and the processes and methods as further described herein, may be implemented using or otherwise include hardware, firmware, software, or any combination thereof (other than software per se).

Thus, by way of example but not limitation, second device 904 may include at least one processing unit 920 that is operatively coupled to a memory 922 through a bus 928.

Processing unit 920 is representative of one or more circuits to perform at least a portion of a computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof.

Memory 922 is representative of any storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

Secondary memory 926 may include, for example, the same or similar type of memory as primary memory or one or more storage devices or systems, such as, for example, a disk drive, an optical disc drive, a tape drive, a solid state memory drive, etc. In certain implementations, secondary memory 926 may be operatively receptive of, or otherwise able to couple to, a computer-readable medium 932. Computer-readable medium 932 may include, for example, any medium that can carry or make accessible data signals, code or instructions for one or more of the devices in system 900.

Second device 904 may include, for example, a communication interface 930 that provides for or otherwise supports operative coupling of second device 904 to at least network 908. By way of example but not limitation, communication interface 930 may include a network interface device or card, a modem, a router, a switch, a transceiver, or the like.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While certain techniques have been described and shown herein using various methods and systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A method comprising:
    determining, via one or more processors, an entity based at least in part on a submitted search query;
    processing, via the one or more processors, a plurality of lists and a plurality of categories in which the entity has been grouped in at least one content source prior to receiving the submitted search query; and
    determining, via the one or more processors, a particular category, from the plurality of categories, to present, at least partially in response to the submitted search query, for the entity based at least in part on semantic categorization, wherein the semantic categorization is based at least in part on a sum of products over the plurality of lists, in which for a particular list of the plurality of lists, and a product comprises a product of a popularity value of the entity with respect to the particular list and a probability value of the particular list being within the particular category, wherein the popularity value is based, at least on part, on a number of the plurality of lists in which the entity has been grouped.

2. The method of claim 1, and further comprising:
    serving the particular category as an alternate search query to the submitted query or as an alternate for a portion thereof.

3. The method of claim 1, wherein the determining a particular category for an entity comprises:
    determining respective category scores for more than one category associated with the entity; and selecting at least one category of the more than one category based at least in part on the respective category scores.

4. The method of claim 3, wherein the determining the respective category scores comprises, for the particular category over the plurality of lists:
measuring interest for the entity of a list from the plurality of lists; measuring likelihood of the list from the plurality of lists being associated with the particular category of the more than one category; and
calculating the category score for the particular category over the plurality of lists based at least in part on the interest and likelihood measurements.

5. The method of claim 4, wherein the measured likelihood comprises a binary value of one or zero; and wherein the calculating the category score comprises:
computing a product of the measured interest and the measured likelihood for a particular list of the plurality of lists; and summing the computed products over the plurality of lists.

6. The method of claim 4, further comprising acquiring, from one or more content sources, the entity, the plurality of lists, and the more than one category.

7. The method of claim 6, wherein the acquiring the entity, the plurality of lists, and the more than one category further comprises acquiring one or more titles and/or one or more descriptions.

8. The method of claim 7, wherein the acquiring further comprises pruning punctuation from the more the one category, the one or more titles and/or the one or more descriptions.

9. The method of claim 7, wherein the acquiring further comprising applying natural language processing (NLP) to the more the one category, the one or more titles and/or the one or more descriptions to determine the entity, the plurality of lists, and the more than one category.

10. A method comprising:
processing, by one or more processors, one or more signals comprising a particular category, determined from a plurality of categories, to present, at least partially in response to the submitted search query, for an entity based at least in part on semantic categorization, wherein the semantic categorization is based at least in part on a sum of products over the plurality of lists, in which for a particular list of a the plurality of lists in which an entity has been grouped in at least one content source prior to receiving a submitted search query, and a product comprises a product of a popularity value of the entity with respect to a particular list and a probability value of the particular list being within the particular category;
wherein individual ones of the plurality of categories being independent of any submitted search queries and based, at least in part, on the plurality of lists in which the entity has been grouped in the at least one content source, and the popularity value is based, at least on part, on a number of the plurality of lists in which the entity has been grouped.

11. The method of claim 10, wherein the particular category comprises an alternate search query to the submitted query or as an alternate for a portion thereof.

12. The method of claim 10, wherein the determining the particular category for an entity comprises:
determining respective category scores for more than one category associated with the entity; and
selecting at least one category of the more than one category based at least in part on the respective category scores.

13. The method of claim 12, wherein the determining the respective category scores comprises, for the particular category over the plurality of lists:
measuring interest for the entity of a list from the plurality of lists;
measuring likelihood of the list from the plurality of lists being associated with the particular category of the more than one category; and
calculating the category score for the particular category over the plurality of lists based at least in part on the interest and likelihood measurements.

14. The method of claim 13, wherein the measured likelihood comprises a binary value of one or zero; and wherein the calculating the category score comprises:
computing a product of the measured interest and the measured likelihood for a particular list of the plurality of lists; and
summing the computed products over the plurality of lists.

15. An apparatus comprising: a computing platform; said computing platform to:
determine an entity to be based at least in part on a search query to be submitted;
process a plurality of lists and a plurality of categories in which the entity has been grouped in at least one content source prior to receipt of the search query; and
determine a particular category, from a plurality of categories, to present, at least partially in response to the submitted search query, for the entity to be based at least in part on semantic categorization, wherein the semantic categorization is to be based at least in part on a sum of products over the plurality of lists, in which for a particular list of the plurality of lists, a product is to comprise a product of a popularity value of the entity with respect to the particular list and a probability value of the particular list being within the particular category, and wherein the popularity value is to be based, at least on part, on a number of the plurality of lists in which the entity has been grouped.

16. The apparatus of claim 15, said computing platform to further serve the category as an alternate search query to the submitted query or as an alternate for a portion thereof.

17. The apparatus of claim 15, wherein the computing platform further to determine respective category scores for more than one category associated with the entity; and to select at least one category of the more than one category based at least in part on the respective category scores to be determined.

18. The apparatus of claim 17, wherein the computing platform to further, for the particular category over the plurality of lists:
measure interest for the entity of a list from the plurality of lists;
measure likelihood of the list from the plurality of lists to be associated with the particular category of the more than one category; and
calculate the category score for the particular category over the plurality of lists to be based at least in part on the interest and likelihood measurements.

19. The apparatus of claim 18, the computing platform to further compute a product of the interest to be measured and the likelihood to be measured for a particular list of the plurality of lists; and to sum the products to be computed over the plurality of lists.

20. The method of claim 1, wherein the particular list of the plurality of lists are included within one or more of the plurality of categories in the at least one content source.

\* \* \* \* \*